(12) United States Patent
Kosaka et al.

(10) Patent No.: US 6,839,164 B2
(45) Date of Patent: Jan. 4, 2005

(54) OPTICAL TRANSMISSION EQUIPMENT AND SUPERVISORY SYSTEM THEREOF

(75) Inventors: Junya Kosaka, Yokohama (JP); Tadashi Matsuoka, Yokohama (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/796,392

(22) Filed: Feb. 28, 2001

(65) Prior Publication Data

US 2001/0030797 A1 Oct. 18, 2001

(30) Foreign Application Priority Data

Mar. 29, 2000 (JP) .................................... 2000-095200

(51) Int. Cl.$^7$ .............................................. H01S 3/00
(52) U.S. Cl. ................................................... 359/349
(58) Field of Search .......................... 359/349, 337.5, 359/161, 164, 173, 176, 177, 115, 124

(56) References Cited

U.S. PATENT DOCUMENTS

| | | | | |
|---|---|---|---|---|
| 5,392,154 A | * | 2/1995 | Chang et al. | 359/341.3 |
| 5,452,116 A | * | 9/1995 | Kirkby et al. | 359/124 |
| 5,600,466 A | * | 2/1997 | Tsushima et al. | 359/118 |
| 5,675,432 A | | 10/1997 | Kosaka | |
| 5,726,788 A | * | 3/1998 | Fee et al. | 359/163 |
| 5,801,858 A | * | 9/1998 | Roberts et al. | 359/114 |
| 5,864,414 A | * | 1/1999 | Barnsley et al. | 359/110 |
| 5,905,838 A | * | 5/1999 | Judy et al. | 385/123 |
| 5,926,590 A | * | 7/1999 | Mao | 385/24 |
| 5,943,147 A | * | 8/1999 | Vanoli et al. | 359/110 |
| 5,956,440 A | | 9/1999 | Mikami et al. | 385/24 |
| 6,005,997 A | * | 12/1999 | Robinson et al. | 385/24 |
| 6,049,418 A | * | 4/2000 | Srivastava et al. | 359/337.4 |
| 6,069,731 A | | 5/2000 | Bayart | 359/341 |
| 6,091,538 A | | 7/2000 | Takeda et al. | 359/341 |
| 6,091,541 A | | 7/2000 | Yoon | 359/341 |
| 6,101,016 A | * | 8/2000 | Roberts et al. | 359/124 |
| 6,163,398 A | * | 12/2000 | Inagaki et al. | 359/124 |
| 6,173,094 B1 | * | 1/2001 | Bowerman et al. | 359/161 |
| 6,201,635 B1 | * | 3/2001 | Yamanaka et al. | 359/160 |
| 6,219,162 B1 | * | 4/2001 | Barnard et al. | 359/110 |
| 6,233,074 B1 | * | 5/2001 | Lahat et al. | 359/118 |
| 6,236,478 B1 | * | 5/2001 | Stoll | 359/110 |
| 6,236,500 B1 | * | 5/2001 | Suzuki et al. | 359/124 |
| 6,259,555 B1 | * | 7/2001 | Meli et al. | 359/337 |
| 6,292,289 B1 | * | 9/2001 | Sugaya et al. | 359/177 |
| 6,310,716 B1 | * | 10/2001 | Evans et al. | 359/124 |
| 6,348,987 B1 | * | 2/2002 | Tomofuji | 359/177 |
| 6,400,498 B1 | * | 6/2002 | Shimomura et al. | 359/341.1 |
| 6,417,945 B2 | * | 7/2002 | Ishikawa et al. | 359/124 |
| 6,421,167 B1 | * | 7/2002 | Cohen et al. | 359/337 |
| 6,580,550 B1 | * | 6/2003 | Kosaka et al. | 359/337.1 |

FOREIGN PATENT DOCUMENTS

| | | | |
|---|---|---|---|
| EP | 0802645 | 10/1997 | H04J/14/02 |
| JP | 10-173264 | 6/1998 | H01S/3/10 |
| JP | 11-121840 | 4/1999 | H01S/3/07 |

OTHER PUBLICATIONS

Sietmann "Ein Verstärker für alle Kanäle," Funkschau, Franzis–Verlag K.G., Munchen, DE, 62:52–55 (1990).

* cited by examiner

*Primary Examiner*—Mark Hellner
*Assistant Examiner*—Deandra M. Hughes
(74) *Attorney, Agent, or Firm*—Townsend and Townsend and Crew LLP (57) ABSTRACT

Dependence on wavelength makes it difficult to lengthen the distance while increasing the density of wavelength division multiplexing. An optical signal expander module for a group of wavelength bands in a transmission system is provided and configured to solve the problem of dispersion and to achieve both a longer distance and higher density of wavelength division multiplexing that can be traded off.

20 Claims, 7 Drawing Sheets

OPTICAL TRANSMISSION EQUIPMENT AND SUPERVISORY SYSTEM THEREOF

BACKGROUND OF THE INVENTION

The present invention relates to WDM (Wavelength Division Multiplexing) optical transmission equipment and more particularly to the optical transmission equipment located in a relay station.

To reduce transmission system cost, improvement of the transmission rate as well as increased density and distance capability of WDM have been sought. In general, however, improvement of the transmission rate entails problems in realizing dispersion compensation over a wide band. Dispersion compensation means compensation for waveform distortion of light signals based on the dispersion of the light signal through a transmission line. A fiber optic line contains dispersion characteristic parameters that depend on the wavelength of the light signal. The dispersion effect becomes greater as the fiber is lengthened. In particular, with dispersed compensation for wide band applications, it is quite difficult to achieve optimal compensation over all the bands.

Optical transmission technology effectively employs optical amplifiers to boost the signals on a fiber. In an optical amplifier, however, noise and gain characteristics that restrict transmission also depend on wavelength. When optical amplifiers are placed at various stages along the transmission line, the number of stages between the amplifiers affects the transmission, that is, the critical distance of the transmission is variable depending on the wavelength of the light signal. In WDM transmission, therefore, systems have generally been configured to suit the most limited wavelength characteristic, that is, the wavelength that has the shortest transmission distance. This is because a light signal of any other wavelength may be reliably transmitted. For the technology of WDM, one may refer to the optical amplifier described in JP-A-8-278523 (corresponding to U.S. Pat. No. 5,675,432).

The wavelength dependency described above creates difficulties in making the transmission line longer as WDM density is increased. This tradeoff is an obstacle to configuring the transmission system at low cost.

Further, a new technology has been studied for dropping or adding a signal wavelength of part of a wavelength band at a node located on a transmission line. With application of this technology, the multiplexed light signals transmitted on the same fiber by different nodes may be transmitted as WDM light. Since the transmission condition depends on a signal wavelength, and multiple wavelengths are typically transmitted on the different bands, which are then transmitted all together, achieving efficient dispersion compensation on all bands, has proved difficult.

BRIEF SUMMARY OF THE INVENTION

It is an object of the present invention to provide an optical transmission system that is configured to include an optical signal expander that helps solve the problem of dispersion and to achieve a longer distance and higher WDM density.

BRIEF DESCRIPTION OF THE DRAWINGS

Preferred embodiments of the present invention will now be described in conjunction with the accompanying drawings, in which.

DETAILED DESCRIPTION OF THE INVENTION

Figure 1:
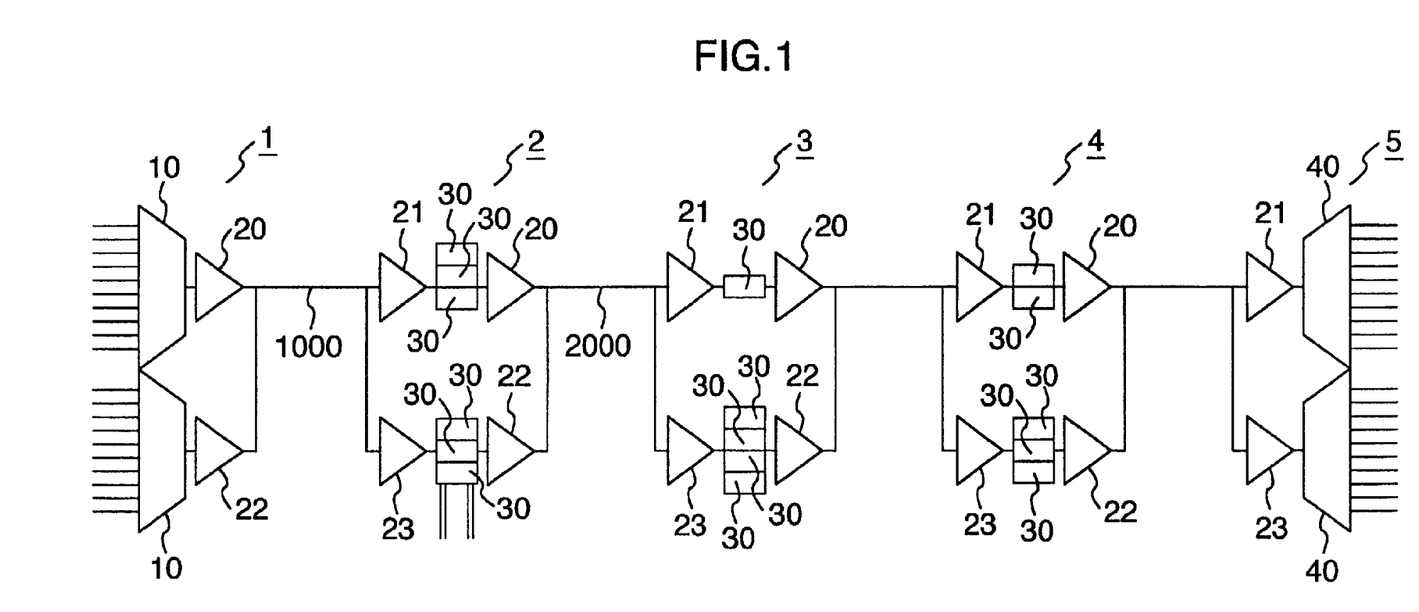
FIG. 1 is a block diagram showing an optical transmission system according to an embodiment of the present invention.

The embodiments of the invention are described with reference to the appended drawings. FIG. 1 is a block diagram for describing an arrangement of an optical transmission system according to an embodiment of the present invention. This system is arranged to transmit a signal from an end station 1 to another end station 5. Relay stations 2, 3 and 4 are located between end stations 1 and 5. Relay station 2 enables demultiplexing or multiplexing of multiple wavelengths. For amplification, the WDM signal is separated into a blue band ranging from 1530 to 1545 nm and a red band ranging from 1547 to 1560 nm, the corresponding signals on each band being amplified en masse.

At end station 1, light signals transmitted by optical transmission equipment (not shown) are multiplexed in an optical multiplexer 10. The multiplexed light signal is amplified by optical amplifiers 20 and 22 and sent to a coupler (not shown) in which they are multiplexed. Then, the multiplexed light signal is input into transmission fiber 1000. The light signal transmitted on transmission fiber 1000 is separated into bands by a WDM demultiplexer (not shown) located at relay station 2. Then, the demultiplexed light signals are again amplified by the corresponding optical amplifiers 21 and 23. The amplified light is demultiplexed by an optical demultiplexer (not shown). Each demultiplexed light with its corresponding wavelength is passed through an operation unit (OU) 30 one at a time, is amplified by optical amplifiers 20 and 22, and is sent to transmission fiber 2000. At relay stations 3 and 4, similar transmissions are executed. Then, the light signal is separated into bands by a WDM demultiplexer (not shown) located at end station 5 and is again amplified by optical amplifiers 21 and 23. The amplified WDM signal is separated into light signals of monochrome wavelengths by a WDM demultiplexer 40 and then converted into the corresponding electric signals by an optical receiver (not shown).

Processing unit 30 of this embodiment may be an optical signal expander 30A, a dispersion compensator 30B, a transmission fiber 30C, an optical add-drop module 30D or the like, the details of which will be discussed below. A single processing unit 30 may be installed between optical amplifiers 21, 23 and optical amplifiers 20, 22, or any combination of processing units connected in parallel may be installed therebetween. In this configuration, light signal expander 30a and optical add-drop module 30D pass each light signal of a monochrome wavelength, whereas dispersion compensator 30B and transmission fiber 30C pass a wavelength multiplexed light signal.

The transmission system arranged as described above may maintain a non-relaying transmission interval in relation to each wavelength band against the light signal from end stations 1 to 5, even though only one transmission fiber is in use. "Non-relaying transmission interval" as used herein means a transmission interval between the optical transmitter and the next optical receiver. For example, for a light signal from one part of a band, the interval from end stations 1 to 5 corresponds to the non-relaying transmission interval, while for a light signal from another part of that band, the interval between end station 1 and the optical signal expander corresponds to the first non-relaying transmission interval, and the interval between the light signal expander and the next light signal expander or end station corresponds to the second non-relaying transmission interval.

More specifically, in the optical amplifier, the wavelengths contained in the red band have a relatively small wavelength dependency of gain and noise and thus have a wavelength characteristic that is more advantageous to lengthening the transmission fiber.

If the dispersion compensation is restrictively directed to the signals with such bands, those signals may be transmitted from end stations 1 to 5 without any relay.

On the other hand, the wavelengths contained in the blue band have a relatively large wavelength dependency of gain and noise and thus have a wavelength characteristic that is less advantageous to lengthening the transmission fiber. For these signals, it is preferable to place the light signal expander on the relay stations to shorten the non-relaying transmission interval.

When transmitting light signals of all the wavelengths ranging from 1530 nm to 1560 nm en masse without any relay, the transmission distance is limited by the adverse effect of the blue band wavelength characteristic, which exhibits greater gain and noise. Further, since dispersion compensation is required over a wide band, the transmission distance is more limited.

The present invention makes it possible to transmit multiplexed light signals having discrete transmission intervals on the same fiber. The present invention further facilitates the configuration of the transmission intervals according to the wavelength band, which makes it easier to make the transmission system longer and the WDM density higher, thereby lowering the cost at which the system is configured. Further, the transmission system may be built flexibly for each wavelength band.

Figure 2:
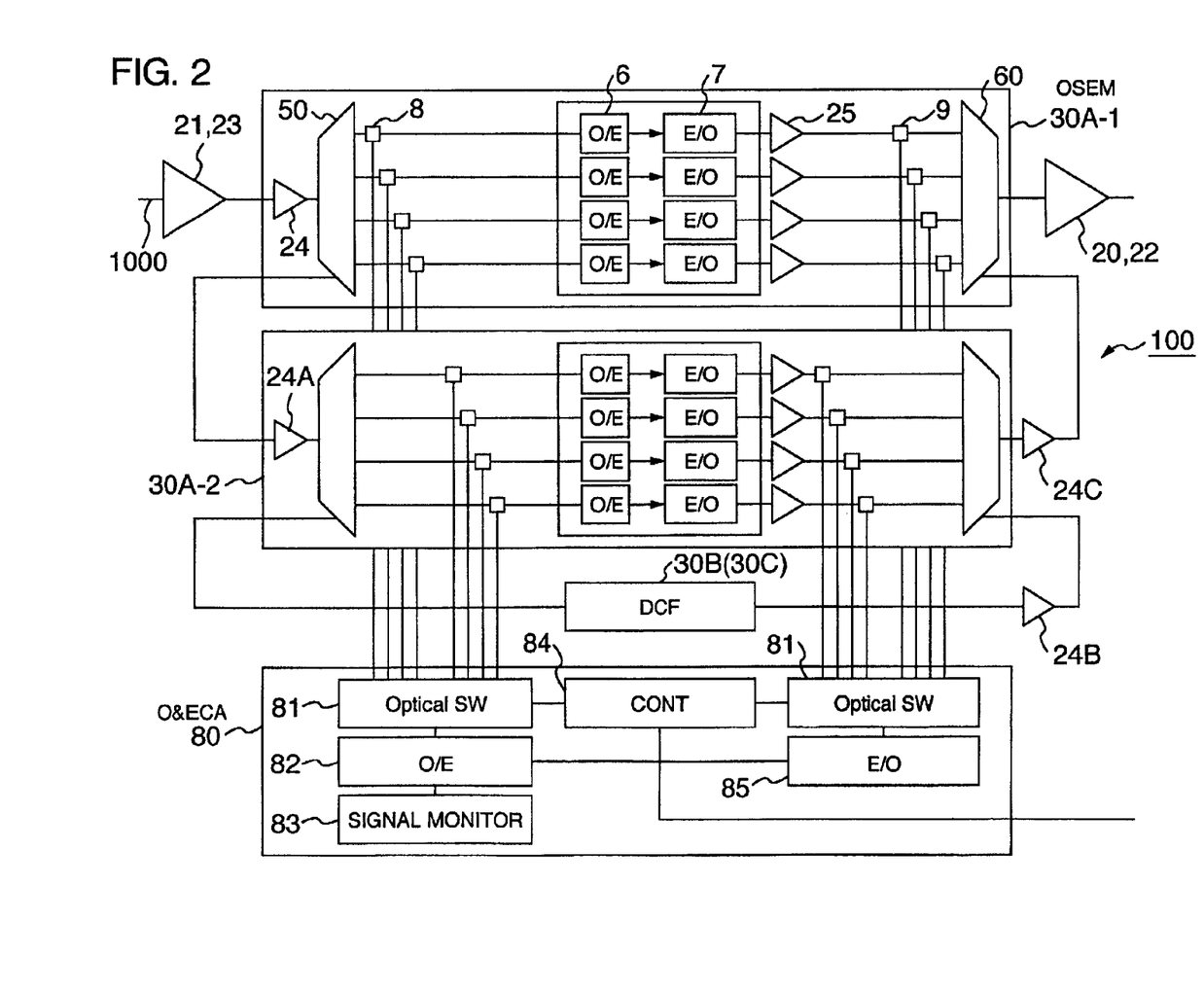
FIG. 2 is a block diagram showing optical transmission equipment according to an embodiment of the present invention.
Figure 3A:
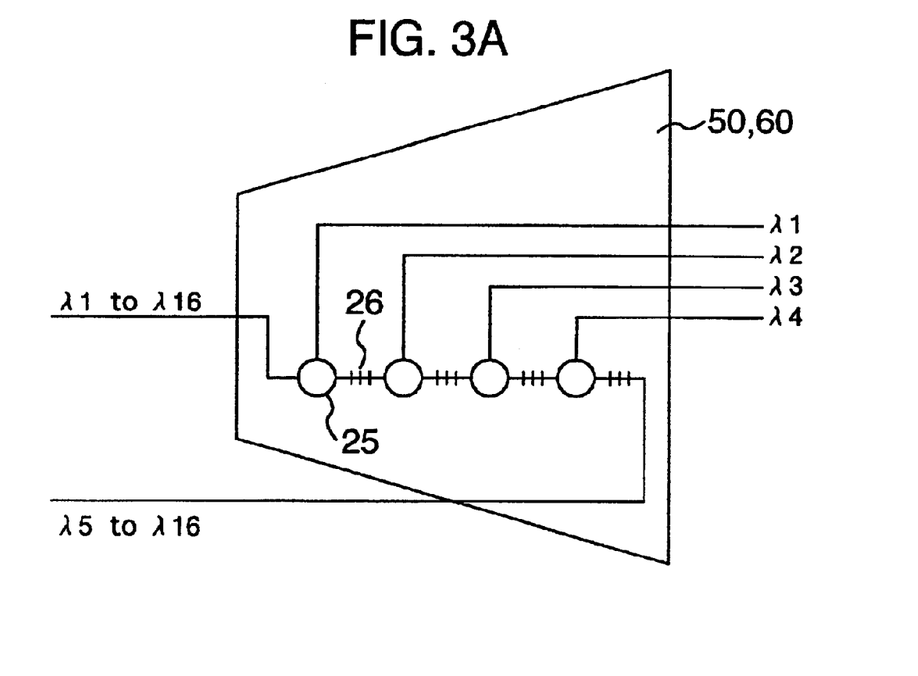
FIG. 3A is a block diagram showing a wavelength demultiplexer included in the embodiment of the invention.
Figure 3B:
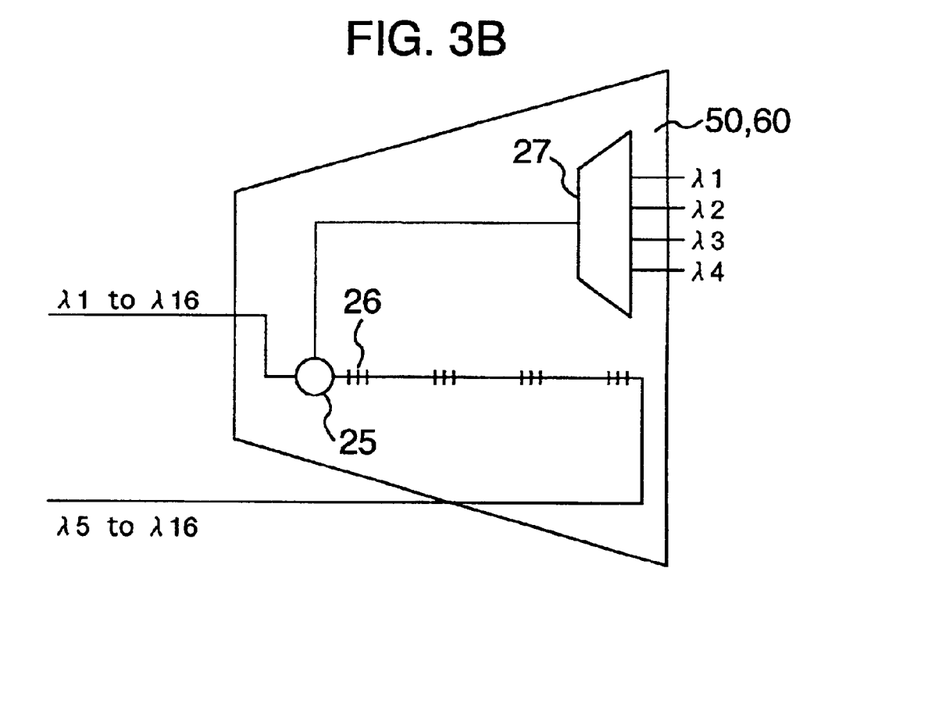
FIG. 3B is a block diagram showing a wavelength multiplexer included in the embodiment of the invention.

The optical transmission equipment according to another embodiment of the invention will be described with reference to FIGS. 2 and 3. FIG. 2 is a block diagram showing optical transmitting equipment located at a relay station. FIG. 3 is a block diagram showing a demultiplexer or a multiplexer.

FIG. 2 shows an optical transmission equipment located at the relay station and is described in conjunction with FIG. 1. A 16-wavelength division multiplexing signal sent from transmission fiber 1000 is amplified by optical amplifiers 21 and 23 and then input into an optical signal expander module (OSEM) 30A-1. The signal is amplified by a low-gain optical amplifier 24 positioned to compensate for a signal intensity loss caused by optical demultiplexing. Then, the signals of four wavelengths are input farther into optical signal expander module 30A-1, while the remaining signals of 12 wavelengths are input into light signal expander module 30A-2. After being amplified by low-gain optical amplifier 24A, the signals of four of the 12 wavelengths are input farther into light signal expander module 30A-2, while the signals of the remaining eight wavelengths are input into dispersion compensator module 30B. The signals of the 8 wavelengths are dispersion compensated in a group by dispersion compensator module 30B and then amplified by optical amplifier 24B. The amplified signals are again passed through optical signal expander module 30A-2, optical amplifier 24C and optical signal expander module 30A-1, in that order, and then multiplexed. Then, the signals of the 16 resulting wavelengths are input into optical amplifiers 20 and 22 and amplified.

On the other hand, the signals of the four wavelengths input to optical signal expander module 30A-1 are partially branched by a light branch module 8 and then put into an optical & electrical channel analyzer (O&ECA) 80. The signal passed through optical branch module 8 is converted to an electric signal (O/E) by an optical receiver 6. Next, the converted signal is subjected to signal waveform adjustment and timing adjustment and is identified and then reproduced. The signal is again converted to the optical signal (E/O) in the optical transmitter. The optically converted signal is amplified by optical amplifier 25 and passed through an optical branch module 9. Then, the signals of four wavelengths and 12 wavelengths are multiplexed by an optical multiplexer 60. Optical amplifier 25 adjusts the transmitted lights to a certain level and compensates for a loss in signal intensity caused by optical multiplexing. A low-gain optical amplifier is sufficient for that purpose. Optical branch module 9 receives the light signal input by optical & electrical channel analyzer 80.

As described above, eight waves of the multiplied 16 waves are temporarily relayed and transmitted, whereas the remaining eight waves are just passed through the dispersion compensator without any relay.

The ordinary relay transmission module extracts a B1 byte in an overhead portion for monitoring an error in the relaying interval. On the other hand, the optical signal expander module of this embodiment performs the "3R" operations (Reshaping, Retiming and Regenerating). The error monitoring operation is executed in the optical & electrical channel analyzer 80, which will be described later.

Next, wavelength demultiplexer 50 for demultiplexing the WDM signal and wavelength multiplexer 60 are described with reference to FIG. 3. The description focuses on wavelength demultiplexer 50, which serves as wavelength multiplexer 60 if the traveling direction of the light signal is reversed.

FIGS. 3A and 3B show arrangements of the wavelength separator in which the WDM signal to be input contains 16 wavelengths of λ1 to λ16 multiplexed thereon. In FIG. 3A, the WDM signal passes through an optical circulator 25 and a Bragg grating 26 reflects a wavelength of λ1. Optical circulator 25 allows the light traveling from left to right, as viewed in FIG. 3A, to go straight but outputs the reflected light of wavelength λ1 traveling from right to left into a third port from which the wavelength λ1 is picked up. Likewise, wavelengths λ2 to λ4 are separated and then picked up, in order. On the other hand, 12 wavelengths λ5 to λ16 are output as they are, that is, as multiplexed. The wavelength separator shown in FIG. 3B outputs reflected optical signals λ1 to λ4 to the third port via an optical circulator and then separates the signals into their respective wavelengths through a waveguide-type WDM module 27 from which signals λ1 to λ4 are picked up. In contrast, the 12 wavelengths λ5 to λ16 are output as they are, that is, as multiplexed.

In this embodiment, dispersion compensator module 30B may be placed not only at the site shown, but also at the output portion of the optical amplifier of the previous stage or of a later stage. The location of module 30B in such places makes it possible to do the dispersion compensation essentially around all the signals. Transmission fiber 30C may be installed at the position of module 3B. In this case, eight of 16 waves multiplied on a signal are temporarily relayed and then transmitted, while the remaining eight waves are amplified and directly transmitted without any relay.

This type of arrangement makes it possible to perform a multiplexing and demultiplexing operation for four wavelengths as a unit and thus to simply group several wavelengths at a time in the optical signal expander module. In addition, the optical signal expander module, the dispersion compensator, the optical add-drop module, and the transmission fiber may be added to the arrangement. Low-gain optical amplifier 24 contributes greatly to compensating for the loss of signal intensity caused by optical multiplexing and demultiplexing, and enables the connection of such components with any expander module.

Figure 4:
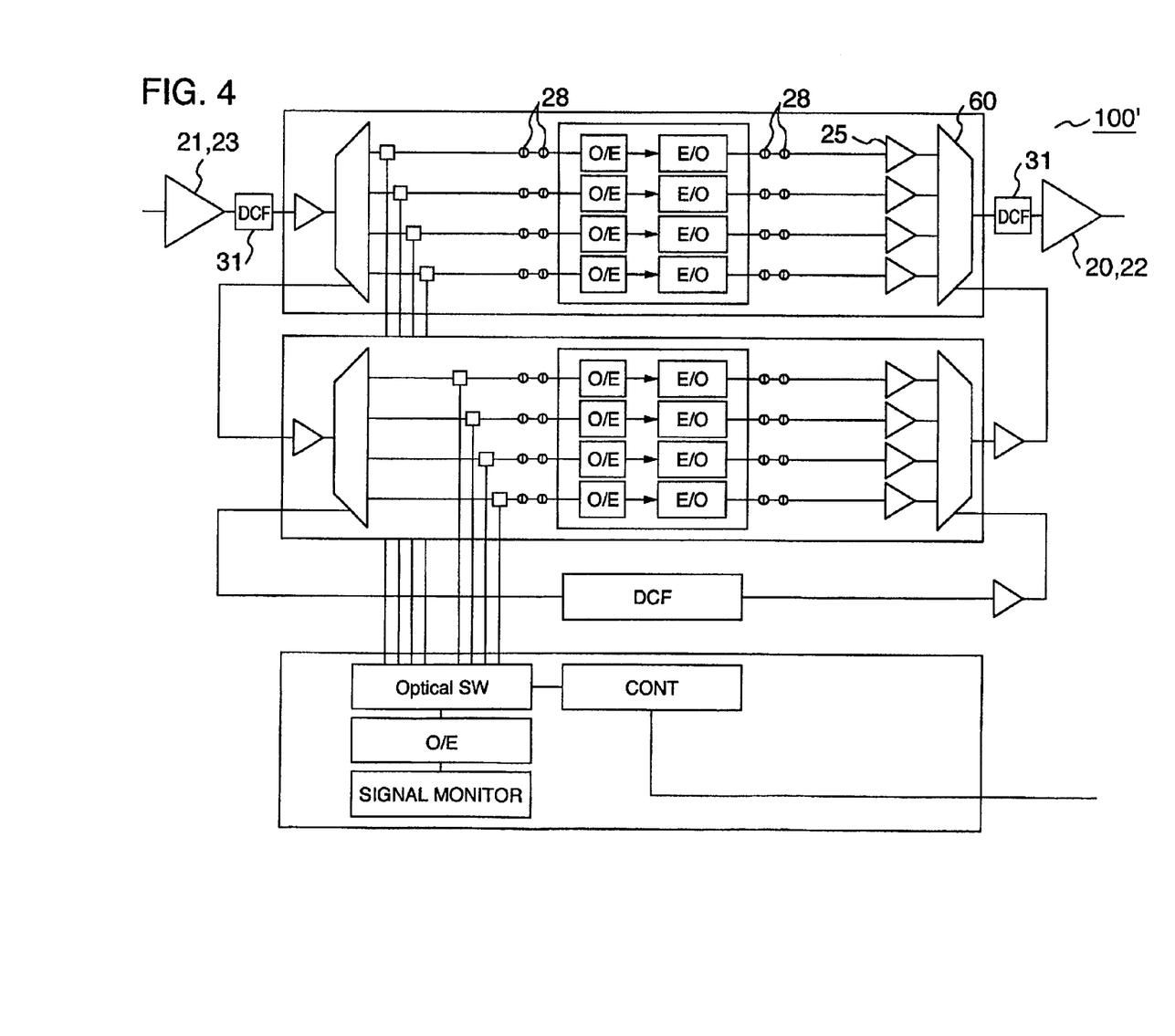
FIG. 4 is a block diagram showing an optical transmission equipment according to an embodiment of the invention.
Figure 5:
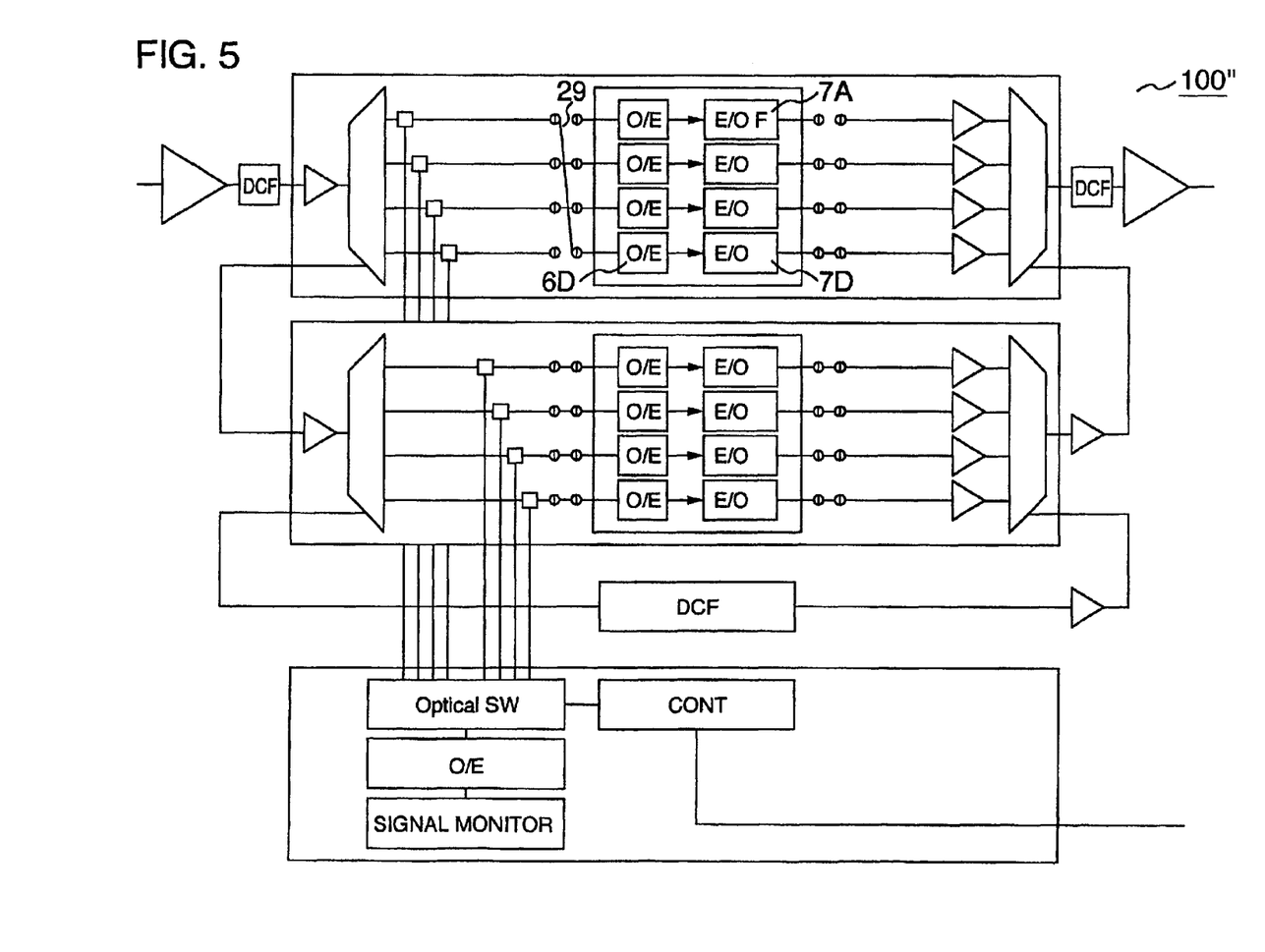
FIG. 5 is a block diagram showing an optical transmission equipment according to another embodiment of the invention.
Figure 6:
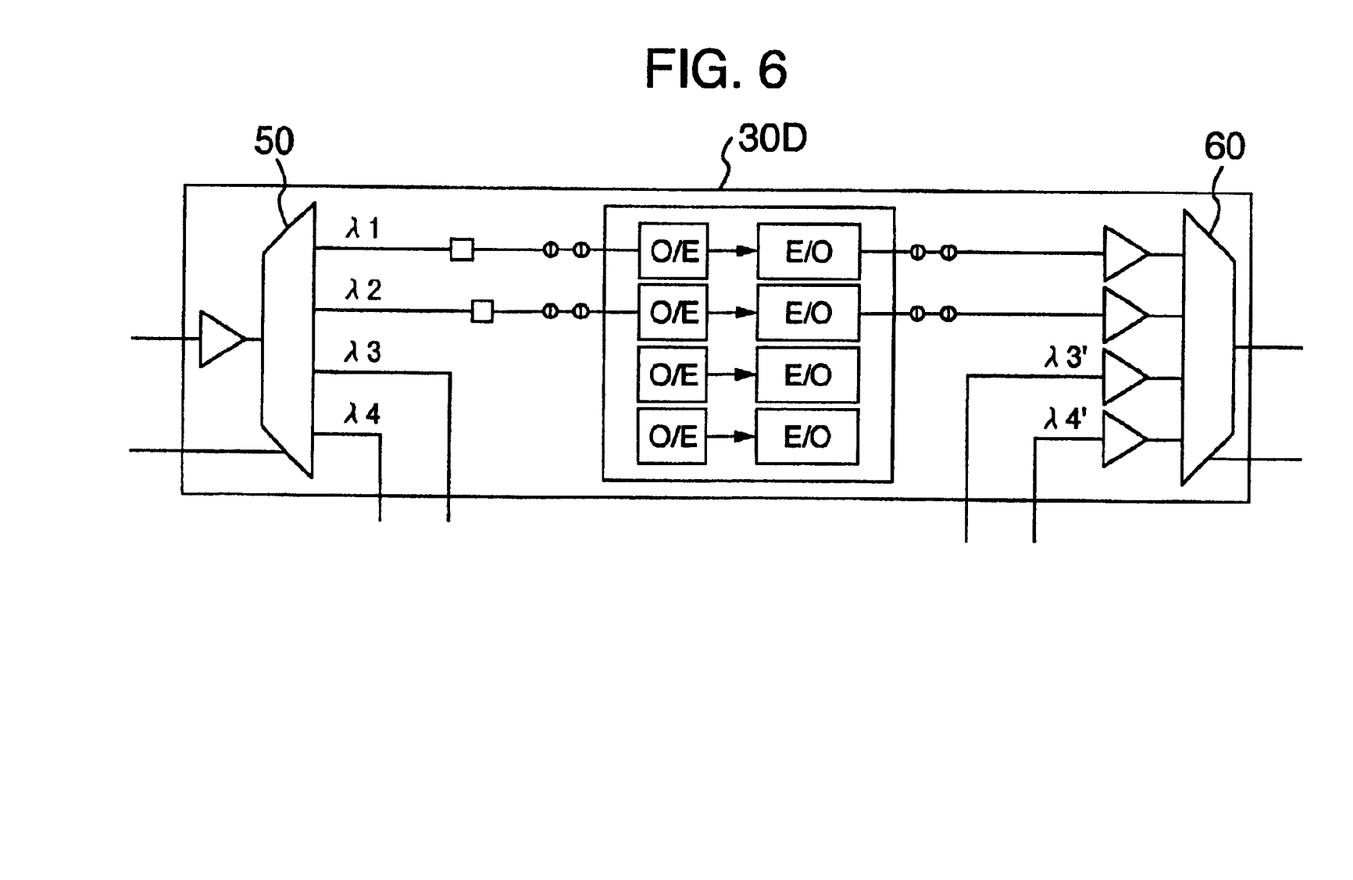
FIG. 6 is a block diagram showing add-drop transmission equipment according to an embodiment of the invention.

The optical transmission equipment according to another embodiment of the invention is now described with reference to FIGS. 4 to 6, in which FIGS. 4 and 5 are block diagrams showing the optical transmission equipment located in a relay station and FIG. 6 is a block diagram showing an optical add-drop module.

The optical transmission equipment shown in FIG. 4 additionally provides an optical connector 28 and a dispersion compensator 31, optical connector 28 being located at the previous stage of the receiver provided in the optical signal expander of the optical transmission equipment shown in FIG. 2 and the later stage of the transmitter provided therein; and the dispersion compensator 31 being located at the later stage of optical amplifiers 21 and 23 and the first stage of optical amplifiers 20 and 22. This addition provides optical transmission equipment 100' with a light transponder function and an add-drop function. Optical branch module 9 located between optical amplifier 25 and optical multiplexer 60, and optical & electrical channel analyzer 80 are removed from the optical transmission equipment shown in FIG. 4. The optical & electrical channel analyzer is discussed later.

It is assumed that in the optical transmission equipment 100" shown in FIG. 5 wavelengths λ1 to λ3 are for the principal use and wavelength λ4 is for preliminary use. Assuming that optical transmitter 7A of λ1 is out of order, the checker finding the failure reports the fact to end station 1 so that signal λ1 may be stopped. Then, optical fiber 29 connecting optical connectors 28 to optical transmitter 7A is replaced by receiver 6D of λ4, which belongs to the preliminary system. The system reports to end station 5 that the preliminary system is being used and has end station 1 restart the signal transmission of wavelength λ1. In general, though the optical transmitter sends out light having a special narrow wavelength, the optical receiver may be operated over a wide band. Hence, if the optical transmitter is out of order, the transmission is made possible by changing the wavelength. Moreover, by using a wavelength-variable light source for optical transmitter 7D of the preliminary system, the transmission is made possible without changing the wavelength. As mentioned above, the provision of a connector between optical demultiplexer 50 and optical receiver 6 provides the optical transmission equipment with the transponder function and the transmitter function of the preliminary system.

FIG. 6 shows an optical add-drop module 30D, which is an arrangement of optical signal expander module 30A, dropping wavelengths λ3 and λ4 for communication from end station 1 to end station 2 and receiving these wavelengths through a receiver (not shown). The light signals of wavelengths λ3' and λ4' from the transmitter (not shown) are added from the connector at the previous stage of wavelength multiplexer 60. In the configuration shown in FIG. 4, dispersion compensator 31 located at the later stages of optical amplifiers 21 and 23 is optimally designed for a signal to be dropped and dispersion compensator 31 located at the previous stage of optical amplifiers 20 and 22 is optimally designed for a signal to be added. This arrangement makes it possible for optical add-drop module 30D to simply add and drop a light signal and to temporarily relay a signal not to be added or dropped during the transmission. The arrangement thus allows the signal to be simply switched without one's having to consider transmission distance to determine whether or not to add or drop a signal.

Next, a the description of the optical & electrical channel analyzer is presented with reference to FIG. 2, following some preliminary background information. In response to the demand to increase transmission capacity, current technology has tried to enhance conventional low-speed systems by finding any aspect of a transmission path that might be given low or no priority in favor of developing a super-high-speed and super-long-distance transmission system in which irregularities occurring on a transmission path could be managed with high accuracy when the end stations were built.

The conventional transmission path has been configured as a reliable system for coping with a reliably treatable simple abnormality such as "line disconnection". In that configuration, it has been satisfactory to disconnect the transmission path from the end station and for the end station itself to have detected an abnormality occurring therein.

However, optical transmission is a special case and thus the end station cannot be disconnected from the transmission line. To configure a highly reliable system, it is important to inclusively manage the end stations and the transmission path. In this embodiment, the provision of the optical branch module for the optical & electrical channel analyzer in the optical signal expander directly connects the signal expander to the optical & electrical channel analyzer. Further, the optical & electrical channel analyzer enables the temporary removal or prevention of a possible defect in the end station and the transmission path. When a certain irregularity takes place, it is possible to analyze what degree of deficiency has taken place in which module. This is effective in keeping the adverse effects caused by a system failure to a minimum.

Initially, until the operation becomes stable, this system is able to analyze only a channel where an error takes place. In order to meet the needs of the operator, this system may be built in several stages.

The optical & electrical channel analyzer is now described.

As an example, when the transmission quality is degraded, if an abnormality takes place in wavelength λ3, the EM (Element Manager) or LC (Local Craft) outside the optical transmission equipment of this embodiment reports the abnormality. In response, the information that the abnormality has occurred is transferred to all the sites where optical & electrical channel analyzers are placed. In general, when the information is transferred, it is overlapped with a light monitoring signal delivered on the transmission system together with the light signal.

The information reporting the abnormality, as transferred, remotely sets the optical & electrical channel analyzer to λ3 at all the sites where the analyzers are placed.

In this embodiment, an optical switch 81 is provided for remotely switching a receiving signal and a transmission signal. In the actual transmission of the light signal, it is impossible to predict in which of the channels and which of the sites an abnormality may take place. Hence, the remote setting is quite important.

Part of the received light signal of λ3 sent from optical signal expander module 30A is branched by optical branch module 8 and then input into optical & electrical channel analyzer 80. In the analyzer 80, a signal having a given wavelength λ3 in this case) is input into the optical receiver 82, which is located in the analyzer, by means of optical switch 81. Whether or not the signal received by the optical receiver has been properly transmitted is monitored by an overhead signal analyzer (B1 monitor) 83. If no abnormality is found, it means that no irregularity has taken place on this line. Hence, it is considered that the installed module encompasses any defect.

In order to analyze whether or not the module is able receive a signal in the most severe condition, an optical attenuator may be provided at the input unit so that the minimum input can always be input into the receiver.

Further, the received signal is again input into the optical signal expander by means of optical transmitter 85 having a variable wavelength, and may be transmitted by optical branch module 9 inside optical signal expander 30A.

In the configuration of this embodiment, the optical & electrical channel analyzer bypasses the failure-suspicious optical receiver or the optical transmitter inside the optical signal expander module to transmit a signal through the properly-operating optical receiver or transmitter located therein. That is, the analyzer is able to isolate a site where failure takes place.

Figure 7:
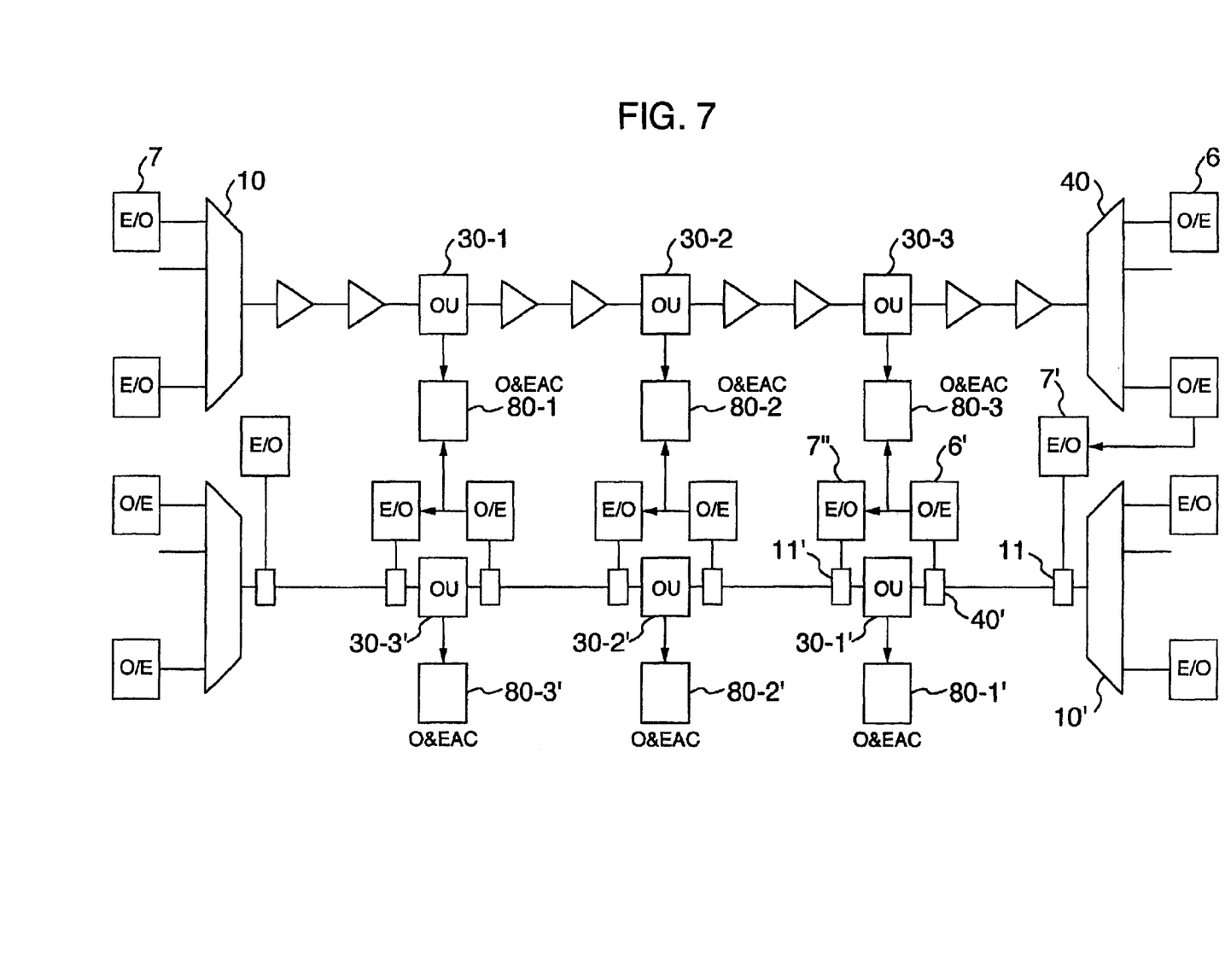
FIG. 7 is a block diagram showing a bidirectional optical transmission system according to an embodiment of the invention.

The analyzing routine is described with reference to FIG. 7. FIG. 7 is a block diagram showing a bidirectional optical transmission system. The upper half of the figure shows a W-E (west to east) transmission path and the lower half shows an E-W (east to west) transmission path. For simplifying the drawing, on the W-E transmission path, a light monitoring signal is omitted and on the E-W transmission path the optical amplifier is omitted.

If an abnormality occurs in any transmission line, the receiving end of the end station detects the abnormality. The information indicating an abnormality is overlapped with any signal delivered on the transmission system together with the light signal when it is transferred. In this embodiment, the signal to be overlapped with the information is the light monitoring signal for the E-W transmission system, which is transmitted opposite the subject W-E transmission system. The information indicating an abnormality detected on the receiving end of the end station located in the W-E transmission system is overlapped with the light monitoring signal and then is transmitted from light monitoring signal transmitter 7' of the E-W transmission system. The transmitted light monitoring signal is input into the E-W transmission line by means of light monitoring signal multiplexer 10', demultiplexed by means of the light monitoring signal demultiplexer 40', and received by the light monitoring signal receiver 6' so that the information for indicating an abnormality may be conveyed to optical & electrical channel analyzer 80. The information transferred as described above enables the optical switch inside of the optical & electrical channel analyzer at each site to select wavelength λ3 in which any abnormality takes place.

As mentioned above, wavelength λ3, where an abnormality takes place, is selected by the optical switch. In the subsequent abnormality analyzing process, whether or not the wavelength is abnormal or normal, the optical switch may be switched remotely from the EM (Element Manager) or LC (Local Craft) outside of the optical transmission equipment at a proper time.

Hereafter, the description is directed to the analysis of an abnormality in the line and the optical signal expander module.

For example, if an abnormality takes place in the optical signal expander module 30-2 shown in FIG. 7, the optical & electrical channel analyzer detects the abnormality not at sites 80-1 and 80-2 (shown) but at site 80-3. If an abnormality takes place on the line between optical signal expanders 30-1 and 30-2, likewise, the analyzer detects the abnormality not at sites 80-1 and 80-2 but at site 80-3. That is, if in this system, an abnormality takes place in the receiving end of the end station, optical & electrical channel analyzers 80-1 and 80-2 do not detect the abnormality, and analyzer 80-3 does detect abnormality, it is possible to specify that the abnormality has occurred in the optical signal expander module 30-2 or on the line between expander module 30-1 and 30-2.

That is, according to the invention, the detection of abnormality by the installed optical & electrical channel analyzers allows the abnormality in the optical signal expander at a specific spot or on a specific portion of the line to be detected.

The analyzing routine of the line and the optical signal expander module and the returning routine to be executed if an abnormality occurs in the optical signal expander module will be described more concretely.

As part of the analyzing and returning routines, it is preferable that an operation is executed to take a first step (1) of removing an abnormality resulting from the transmission line and a second step (2) of checking the optical signal expander module or transmitter and receiver where the abnormality takes place.

1. An operation is executed to make sure that no abnormality of the line condition (line fiber loss, optical fiber connector loss, and the like) takes place or no abnormality of the line design (overall band dispersion compensation, dispersion compensation distribution, and the like) takes place.

(In a case where the number of wavelengths is small)

The optical signal expander module according to the invention enables output of a signal having a different wavelength from that of the signal input into the optical signal expander itself by switching the optical connector. If an abnormality is detected in a certain wavelength and the number of wavelengths being transmitted is small, the wavelength of the oncoming signal is switched into some wavelengths prepared in the optical signal expander module before the oncoming signal was transmitted. This is to ensure that no problem takes place in transmitting the wavelengths. This is done because if a problem resulting from the line takes place, a similar problem can be detected in the neighboring wavelengths. If no abnormality can be detected in the neighboring wavelengths, the operation shifts to routine 2.

(In a case that the number of wavelengths is great)

The operation is executed to ascertain whether or not a similar problem has taken place in the neighboring wavelengths that have been transmitted. This is done because if a problem resulting from the line takes place, a similar problem can be detected in the neighboring wavelengths. If no similar abnormality can be detected in the neighboring wavelengths, the operation shifts to routine 2.

2. If no abnormality on the line is specified by routine 1, an operation is executed to check the optical signal expander module or the transmitter and the receiver where an abnormality may take place.

The optical switches inside of the optical & electrical channel analyzer at all the sites are tuned to the wavelength in which the abnormality detected on the receiving end took place.

As mentioned above, the operation is executed to specify the optical & electrical channel analyzer at the site where abnormality was detected and the optical & electrical channel analyzers at the sites where no abnormalities are detected, for the purpose of specifying the optical signal expander module where an abnormality takes place (at a time when the abnormality on the transmission line has already been removed).

The optical signal expander module in which abnormality is specified is replaced with a sound optical signal expander module. The foregoing routine makes it possible to specify the abnormality and replace the defective module with a sound module, thereby returning the problematic transmission system to a sound state.

The first feature of this method is to easily analyze the abnormality of the transmission path through the optical signal analyzer module. The second feature of this method is to easily make sure whether or not a problem is occurring in multiple wavelengths by making use of the general fact that several wavelengths are being transmitted on a transmission path in a group and if an abnormality takes place on the transmission path, the abnormality is probably occurring on one of these wavelengths, and by making use of the fact that the optical signal expander module handles multiple wavelengths and that only one signal wavelength input into the optical signal expander module can be switched into these wavelengths.

The optical & electrical channel analyzer can be used in the following various forms according to maintenance conditions.

1. Changeable Optical & Electrical Channel Analyzer

Used only when the transmission system has risen and an abnormality takes place. It is installed outside of the system or carried by a maintenance person.

2. Permanent Optical & Electrical Channel Analyzer Provided with Remote Optical Channel Switch Operated to remotely switch the channel in which an abnormality takes place by means of a transmission signal sent from a specific remote site when the transmission system has risen or if an abnormality takes place, and then to analyze the signal.

3. Permanent Optical & Electrical Channel Analyzer Provided with Self-Changeable Optical Channel Switch Operated to switch all the signal wavelengths at certain time intervals, one after another, and to intermittently monitor all the wavelengths through the optical & electrical channel analyzer.

For example, the following customer's requests may be considered.

A) A customer desires to "positively install all the optical & electrical channel analyzers"

→Changeable Optical & Electrical Channel Analyzer

B) A customer desires to "be able to specify a defective portion within one day when an abnormality is detected by the end station.

→Changeable Optical & Electrical Channel Analyzer

C) A customer desires to "be able to remotely specify a defective portion when an abnormality is detected by the end station."

→Permanent Optical & Electrical Channel Analyzer Provided with Remote Optical Channel based on Light Monitoring Signal D) A customer desires to "monitor a defect in all the optical signal expanders in order of "minutes".

→Permanent Optical & Electrical Channel Analyzer Provided with Self-changeable Optical Channel Switch As described above, even a small number of optical & electrical channel analyzers greatly improves the reliability of the transmission system. Further, since the analysis is made possible without visiting all the sites, it is possible to greatly reduce the time taken in servicing the system and the cost of maintenance service.

According to the invention, an optical signal expander capable of transmitting a group of multiplexed wavelengths on a single fiber in a transmission system is provided for making the transmission distance longer and the wavelength multiplexing density higher. Further, an optical & electrical channel analyzer keeps the adverse effects caused by a system failure to a minimum.

What is claimed is:

1. Optical transmission equipment comprising:
    a wavelength divider for dividing a received multiplexed wavelength optical signal by wavelength band into a first wavelength band optical signal and a second wavelength band optical signal in accordance with a characteristic of an optical amplifier dependent on wavelength;
    a first optical amplifier for amplifying the first wavelength band optical signal at an input side of the optical transmission equipment;
    a second optical amplifier for amplifying the first wavelength band optical signal at an output side of the optical transmission equipment;
    a first processing unit coupled between the first optical amplifier and the second optical amplifier;
    a third optical amplifier for amplifying the second wavelength band optical signal at the input side of the optical transmission equipment;
    a fourth optical amplifier for amplifying the second wavelength band optical signal at the output side of the optical transmission equipment; and
    a second processing unit coupled between the third optical amplifier and the fourth optical amplifier,
    wherein each of the first and second processing units further divides the first and second wavelength band optical signals into narrower wavelength band optical signals and performs processing on the narrower wavelength band optical signals depending on respective narrower wavelength bands.

2. Optical transmission equipment as claimed in claim 1, wherein the first processing unit comprises:
    a first processing part for extracting a first optical signal from the first wavelength band optical signal amplified by the first optical amplifier and performing a first processing operation on the first optical signal to output the processed signal as a fourth multiplexed wavelength optical signal and the remainder of the extraction as a second multiplexed wavelength optical signal;

a second processing part for performing a second processing operation on the second multiplexed wavelength optical signal to output the processed signal as a third multiplexed wavelength optical signal; and a multiplexer for multiplexing the third multiplexed wavelength optical signal and the fourth multiplexed wavelength optical signal to output the multiplexed signal to the second optical amplifier.

3. Optical transmission equipment as claimed in claim 1, wherein the second processing unit comprises:

a first processing part for extracting a first optical signal from the second wavelength band optical signal amplified by the third optical amplifier and performing a first processing operation on the first optical signal to output the processed signal as a fourth multiplexed wavelength optical signal and the remainder of the extraction as a second wavelength multiplexed optical signal;

a second processing part for performing a second processing operation on the second multiplexed wavelength optical signal to output the processed signal as a third multiplexed wavelength optical signal; and a multiplexer for multiplexing the third multiplexed wavelength optical signal and the fourth multiplexed wavelength optical signal to output the multiplexed signal to the fourth optical amplifier.

4. Optical transmission equipment as claimed in claim 2, wherein at least one of the first processing part and the second processing part comprises:

a wavelength demultiplexer for demultiplexing a multiplexed wavelength optical signal into separate optical signals having different wavelengths;

an optical receiver for converting the demultiplexed optical signal into an electric signal;

an optical transmitter for converting the electric signal into an optical signal; and an optical multiplexer for multiplexing the optical signals into a multiplexed wavelength light.

5. Optical transmission equipment as claimed in claim 2, wherein the first processing part or the second processing part comprises a dispersion compensator.

6. Optical transmission equipment as claimed in claim 2, wherein at least one of the first processing part and the second processing part has a signal transmission function using only a transmission fibre.

7. Optical transmission equipment as claimed in claim 3, wherein at least one of the first processing part and the second processing part comprises:

a wavelength demultiplexer for demultiplexing a multiplexed wavelength optical signal into separate optical signals having different wavelengths;

an optical receiver for converting the demultiplexed optical signal into an electric signal;

an optical transmitter for converting the electric signal into an optical signal; and an optical multiplexer for multiplexing the optical signals into a multiplexed wavelength light.

8. Optical transmission equipment as claimed in claim 3, wherein at least one of the first processing part and the second processing part includes a dispersion compensator.

9. Optical transmission equipment as claimed in claim 3, wherein the first processing part or the second processing part has a signal transmission function using only by a transmission fibre.

10. Optical transmission equipment as claimed in claim 1, further comprising:

an optical switch for selecting a specific wavelength signal from the optical signals divided by the processing units for the first and second wavelength band optical signals;

an optical signal receiver for receiving the selected optical signal to convert the signal into an electric signal; and a performance monitor for monitoring the electric signal output from the optical signal receiver.

11. Optical transmission equipment as claimed in claim 1, wherein the wavelength divider divides the signal into a signal having a wavelength band from 1530 to 1545 nm and a signal having a wavelength band from 1547 to 1560 nm.

12. In an optical transmission system having at least one relay station between a transmitting end station and a receiving end station, the relay station for transmitting a multiplexed wavelength signal, a method wherein the relay station:

divides a received multiplexed wavelength optical signal by wavelength band into a first wavelength band optical signal and a second wavelength band optical signal in accordance with a wavelength dependency characteristic of an optical amplifier, amplifies the first wavelength band optical signal at a first amplifier on an inlet of the relay station and at a second amplifier on an outlet of the relay station, amplifies the second wavelength band optical signal at a third amplifier on an inlet of the relay station and at a fourth amplifier on an outlet of the relay station, and between the first optical amplifier and the second optical amplifier and between the third optical amplifier and the fourth optical amplifier, further divides the first and second wavelength band optical signals into narrower wavelength band optical signals and performs signal processing on the narrower wavelength band optical signals depending on respective narrower wavelength bands.

13. An optical transmission system as claimed in claim 12, wherein the signal processing comprises an optical to electrical signal conversion and an electrical to optical signal conversion.

14. An optical transmission system as claimed in claim 12, wherein the signal processing comprises a dispersion compensation.

15. An optical transmission system as claimed in claim 12, wherein the signal processing comprises a signal transmission function using a transmission fibre.

16. An optical transmission system as claimed in claim 12, wherein the relay station further comprises:

an optical switch for selecting a specific wavelength signal from the optical signals divided between the first optical amplifier and the second optical amplifier and between the third optical amplifier and the fourth optical amplifier, an optical signal receiver for receiving the selected optical signal to convert the signal into an electric signal; and a performance monitor for monitoring a performance of the electric signal output from the optical signal receiver.

17. An optical transmission system as claimed in claim 12, wherein the wavelength band after division in the relay station comprise a wavelength band from 1530 to 1545 nm and a wavelength band from 1547 to 1560 nm.

18. Optical transmission equipment comprising:

a first amplifier for amplifying a first multiplexed wavelength optical signal;

a first processing unit for extracting a first optical signal from the first multiplexed wavelength optical signal amplified by the first optical amplifier and performing a first processing on the first optical signal to output the processed signal as a fourth multiplexed wavelength optical signal and the remainder of the extraction as a second multiplexed wavelength optical signal;

a second processing unit for performing a second processing on the second multiplexed wavelength optical signal to output the processed signal as a third multiplexed wavelength optical signal; and a second amplifier input with a multiplexed optical signal into which the third multiplexed wavelength optical signal and the fourth multiplexed wavelength optical signal, wherein each of the first processing unit and the second processing unit comprises:

a wavelength demultiplexer for demultiplexing a multiplexed wavelength optical signal into separate optical signals having different wavelengths;

an optical receiver for converting the demultiplexed optical signal into an electric signal;

an optical transmitter for converting the electric signal into an optical signal; and an optical multiplexer for multiplexing the optical signals into a multiplexed wavelength light, wherein respective outputs of the wavelength demultiplexer are connected with respective inputs of the optical receivers via a first connector, respective outputs of the optical transmitters are connected with respective inputs of the optical multiplexer via a second connector, and the connections between the wavelength demultiplexer and the optical receivers and the connections between the optical transmitters and the optical multiplexer are changeable.

19. Optical transmission equipment as claimed in claim 18, wherein the optical transmission equipment can transmit an optical signal having a wavelength different from that of the received optical signal by changing connections of the first and second connectors.

20. Optical transmission equipment as claimed in claim 18, wherein one of the optical receivers and the optical transmitter connected with the one of optical receivers are provided for back-up use, and if another optical receiver or another optical transmitter fails, a failed path is changed to a path including the one of the optical receiver and the one of the optical transmitter by changing the connections of the first and the second connectors.

* * * * *